Oct. 9, 1934.  L. LARSON  1,976,234
HOUSEHOLD PET'S BED
Filed Jan. 21, 1933  2 Sheets-Sheet 1

Inventor:
Louis Larson.

By F. V. Winters.
Attorney

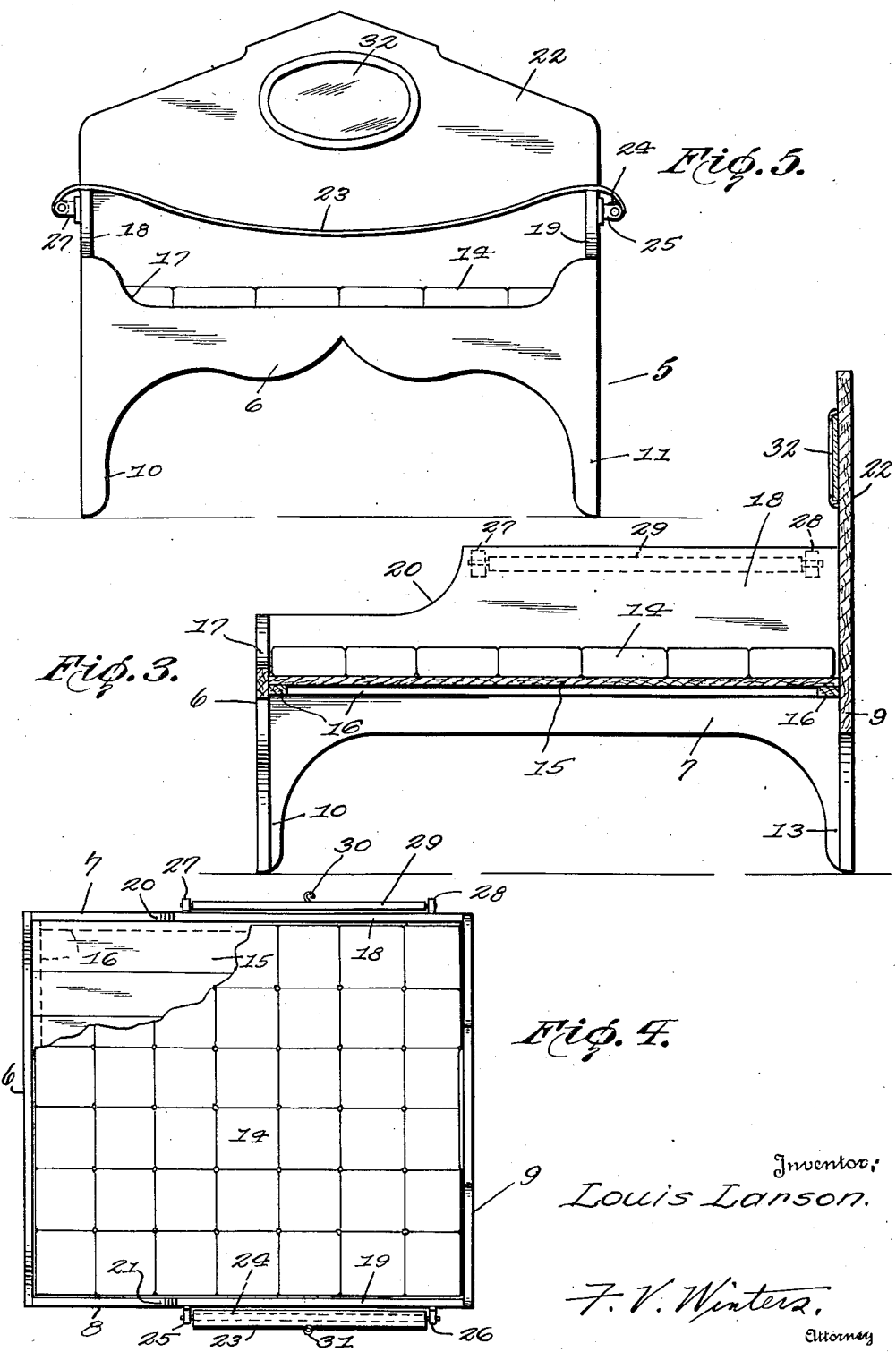

Patented Oct. 9, 1934

1,976,234

UNITED STATES PATENT OFFICE 1,976,234

HOUSEHOLD PET'S BED

Louis Larson, Katonah, N. Y.

Application January 21, 1933, Serial No. 652,886

3 Claims. (Cl. 119—19)

This invention relates to beds for household pets, such as dogs, cats, or the like, wherein a quiet retreat or shelter is provided for the pets for day or night use.

An important object of the invention resides in the provision of a structure which provides a shelter or resting place for the pet, wherein said pet is protected from draughts, and which occupies a small amount of space and which may be readily transported to suitable places within the house or out-of-doors.

Another object is to provide means in the form of a canopy which is adapted to be positioned to protect the pet during the night time, or which may be maintained in a taut condition to serve as a resting place for additional pets.

Another object of the invention is to produce an article which may be made in various sizes to accommodate small and large pets and which is subject to ornamentation and design to match other articles of furniture in a room.

With these objects in view, together with others which will appear as the description proceeds, the invention resides in the novel formation, combination, and arrangement of parts, all as will be described more fully hereinafter, illustrated in the drawings, and particularly pointed out in the claims.

In said drawings:

Fig. 3 is a sectional view taken on line 3—3 of Fig. 1 with the canopy removed, the mattress being shown in elevation.

Fig. 4 is a plan view of Fig. 2, slightly reduced, with parts broken away to expose the support for a mattress or padding.

Fig. 5 is a view like unto Fig. 1, but showing the curtain in a slackened condition.

Referring now more in detail to the accompanying drawings, wherein like characters of reference denote similar parts throughout the several views, let 5 indicate generally the box-like structure forming the bed, said structure embodying a front section 6, side members 7 and 8 and a rear section 9, the aforesaid parts being preferably formed of wood and being fastened together to produce said box-like structure.

Figure 1:
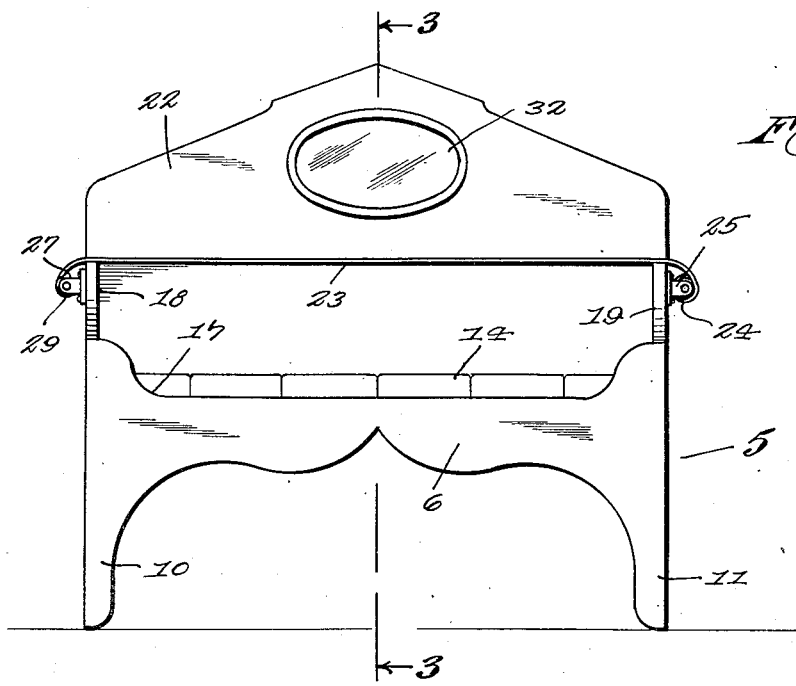
Figure 1 is a front elevation of the article with the canopy or curtain drawn taut over the normal resting place of the pet.
Figure 2:
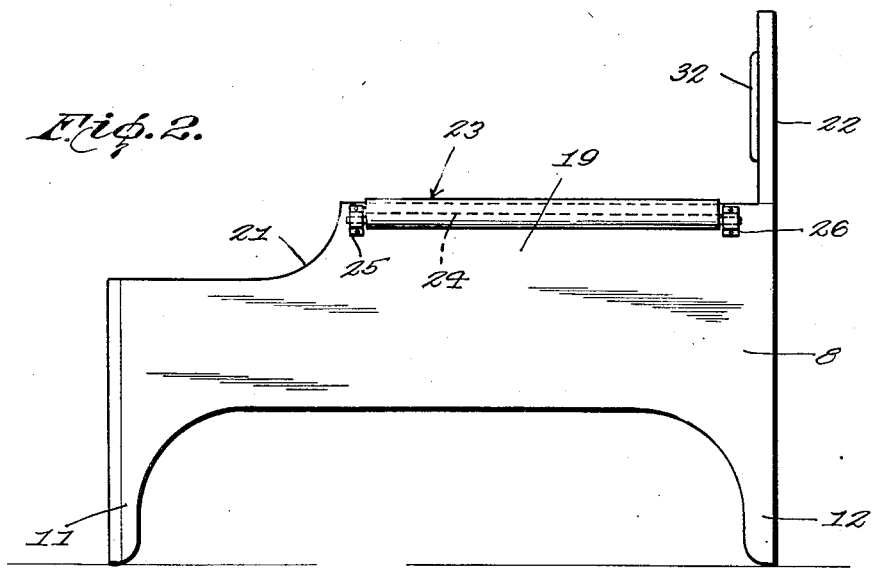
Fig. 2 is a side elevation thereof.

As shown in Figs. 1, 2 and 3 of the drawings the lower portions of the front and rear sections and the side members are cut away to define legs 10, 11, 12 and 13, said legs being of suitable heights and being positioned at the four corners of the structure 5. It will, of course, be understood that the structure may be made in various sizes to accommodate small or large pets and that the height of each leg will be short or long to permit the pet to occupy the device without undue leaping from the floor of a room. To add to the comfort of the occupant of the structure, it is proposed to mount a mattress or padding 14 within said structure, said mattress being supported on a flooring 15, the latter being mounted on a frame-like structure 16, suitably affixed to said front and rear sections and said side members. It is obvious that a fabric spring could be suitably attached to said front and rear sections and said side members and thus serve as a substitute support for said mattress. As said mattress is positioned above the floor of a room it is manifest that the legs of the structure would have to be relatively short so that a small pet could easily leap upon said mattress at the front of the structure. Obviously, larger pets would experience little difficulty in leaping upon the mattress and as the structure as a whole would be increased in size for said pets, the legs of the structure could also assume a reasonable height. As shown in Fig. 1, the front section 6 is provided with a cutout portion 17, which exposes a portion of said mattress 14 and which also facilitates the entrance of the pet into the structure, but it will be noted that said side members 7 and 8 are extended above the level of the top of said front section 6, as indicated at 18 and 19, respectively, though cut-outs 20 and 21, respectively, are provided at the upper front portions of said side members 7 and 8, as shown in Figs. 2 and 3. Also it will be noted that the rear section 9 is extended above said side members 7 and 8, as indicated at 22, (see Fig. 3).

From the foregoing it will be seen that the box-like structure produced is provided with a mattress or padding 14 arranged at a suitable height so that a pet, large or small, may leap thereon by way of the cut-out 17 of the front section 6. As the side members 7 and 8 and the rear section 9 extend above said mattress, it is obvious that the pet occupying the article will be amply protected from currents of air when the article is used indoors or out-of-doors.

To further protect the pet and to satisfy its sense or desire for seclusion, I propose to provide a canopy or curtain 23 which bridges the space between the extensions 18 and 19 of said side members 7 and 8, and which overlies said mattress 14 in the manner indicated in Fig. 1. Said canopy will be made of suitable flexible material, preferably water-proofed, and normally mounted on a roller 24 rotatably carried by brackets 25 and 26 affixed to said side member 8, (see Fig. 4), said side member 7 also being provided with brackets 27 and 28 rotatably supporting another roller 29. When the curtain 23 is not in use it will be carried in a rolled-up condition on said roller 24, as shown in Fig. 4, and hence it is only necessary to unroll said curtain across the upper edges of said extensions 18 and 19 to said roller 29, the latter being provided with a hook 30 to receive the ring 31 carried by said curtain. When the aforesaid operation has taken place, said curtain or canopy 23 assumes the position shown in Figs. 1 and 2 and thus the pet on the mattress is further protected from currents of air in a room or from the direct rays of the sun when the device is placed out-of-doors.

When the curtain 23 is returned to said roller 24, the pet may be exposed to the beneficial rays from the sun, and when the article is placed in a heated room, said curtain may also be removed to afford proper ventilation. During the night it may be desirable to provide a covering for the pet and to this end, said curtain 23 may rest in a slackened condition between the extensions 18 and 19, somewhat like unto that shown in Fig. 5, thus further protecting the pet when the device is used in rooms when the temperature is low.

It will be seen that the device affords a restful and secluded shelter for pets of all kinds, and may be used indoors, as explained hereinbefore. When the curtain 23 is in the position shown in Fig. 1, a pet may rest thereon during the daytime, and at practically all-times a pet may rest beneath the mattress, another pet may rest on the mattress, and still another may sleep on the curtain 23. The article is easily constructed and may be decorated to suit the taste of the owner, and as shown at 32 the upper portion of the rear section 8 may be provided with a mirror or the like.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

I claim:

1. An article of the class described comprising front and rear sections and side members united to form a legged structure, a mattress positioned within said structure, said side members presenting extensions having their top edges above said mattress, a roller carried by each of said side members and a curtain carried by one of said rollers and adapted to be positioned over the top edges of said extensions and to be removably secured to the other roller.

2. An article of the class described comprising front and rear sections and side members united to form a box-like structure, a mattress positioned within said structure, said front section having a cut-out leading in from the upper edge of said section and exposing a portion of said mattress to facilitate the entry of a pet thereon, said side members presenting extensions having their top edges above said mattress, a roller carried by each of said side members and a curtain carried by one of said rollers and adapted to be positioned over the top edges of said extensions and to be removably secured to the other roller.

3. An article of the class described comprising front and rear sections and side members united to form a legged structure, a flooring positioned within said structure, said side members presenting extensions having their top edges above said flooring, a roller carried by each of said side members and a curtain carried by one of said rollers and adapted to be positioned over the top edges of said extensions and to be removably secured to the other roller.

LOUIS LARSON.